April 11, 1944.  W. B. PAYNE  2,346,603
PRINTING APPARATUS
Filed Feb. 28, 1940  7 Sheets-Sheet 1

INVENTOR.
Walter B. Payne
BY Raymond L. Bohrer
his ATTORNEY.

April 11, 1944.  W. B. PAYNE  2,346,603
PRINTING APPARATUS
Filed Feb. 28, 1940  7 Sheets-Sheet 3
Fig. 4
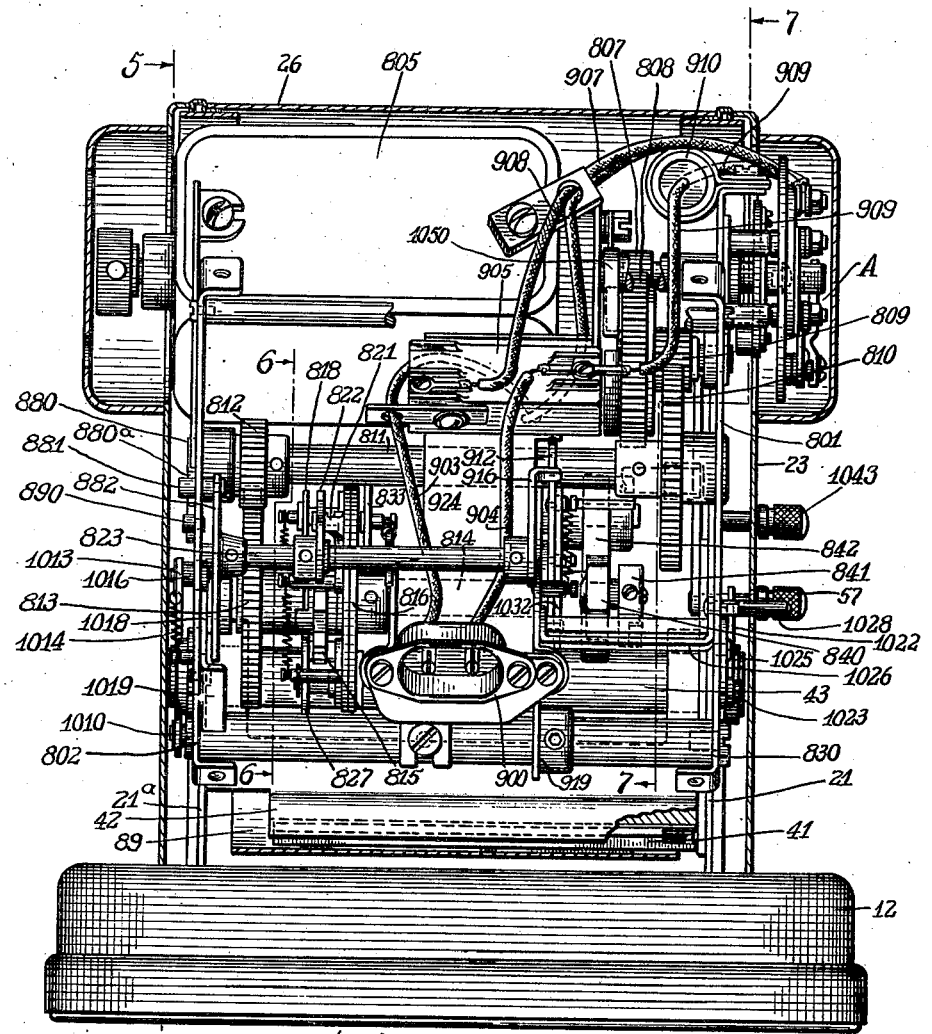
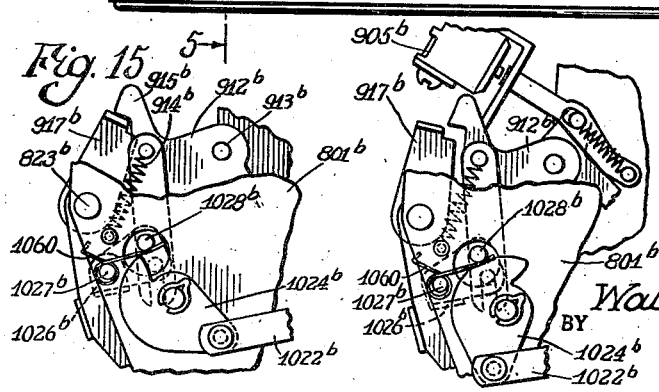
Fig. 15
Fig. 16
INVENTOR.
Walter B. Payne
BY
Raymond L. Bohrer
his ATTORNEY.

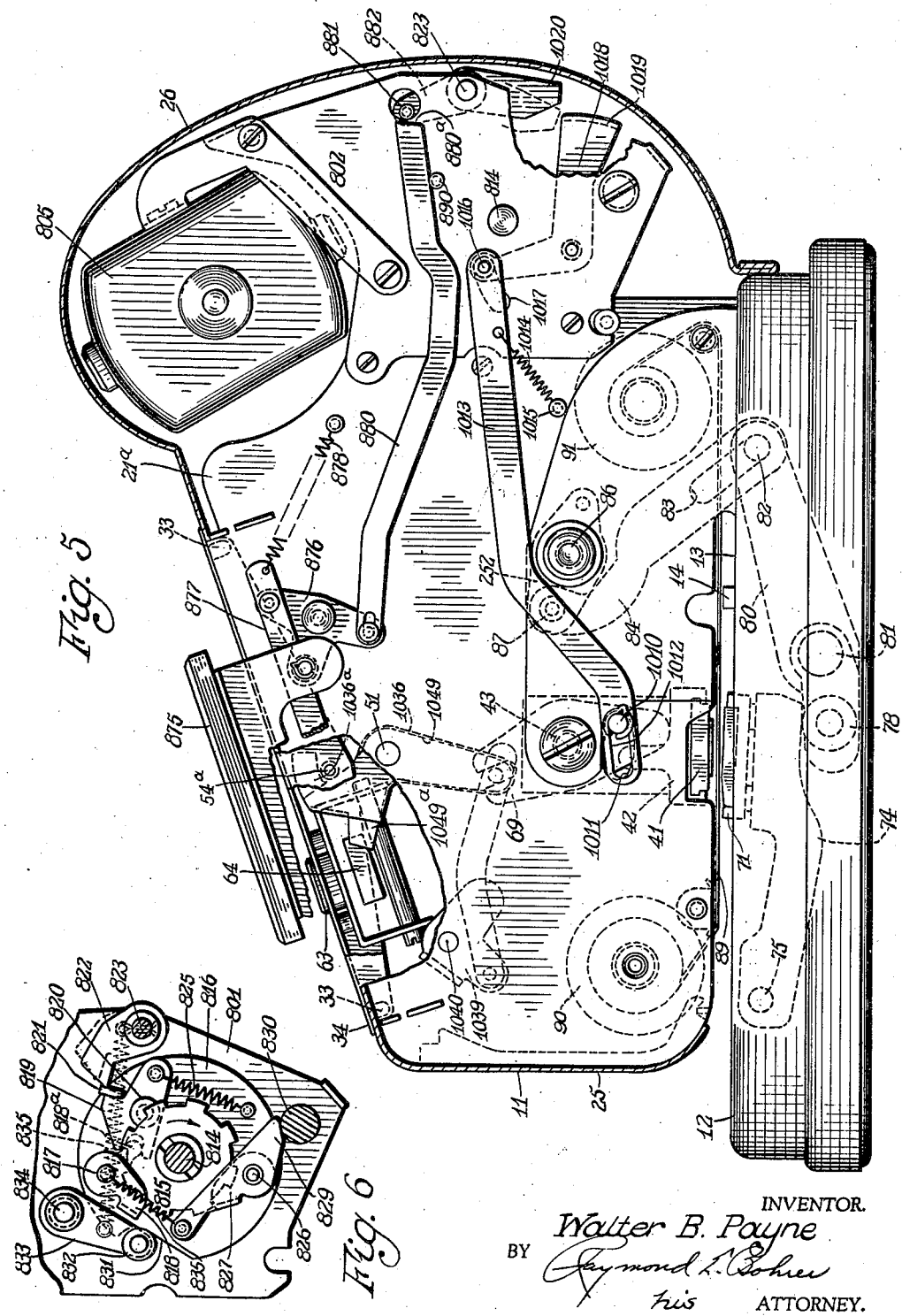

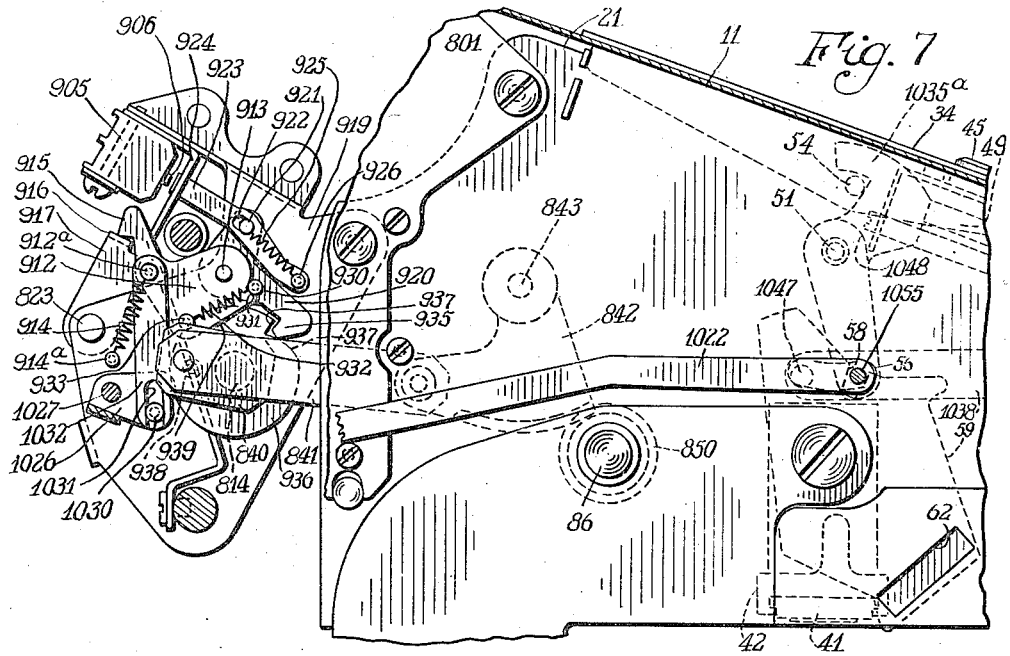
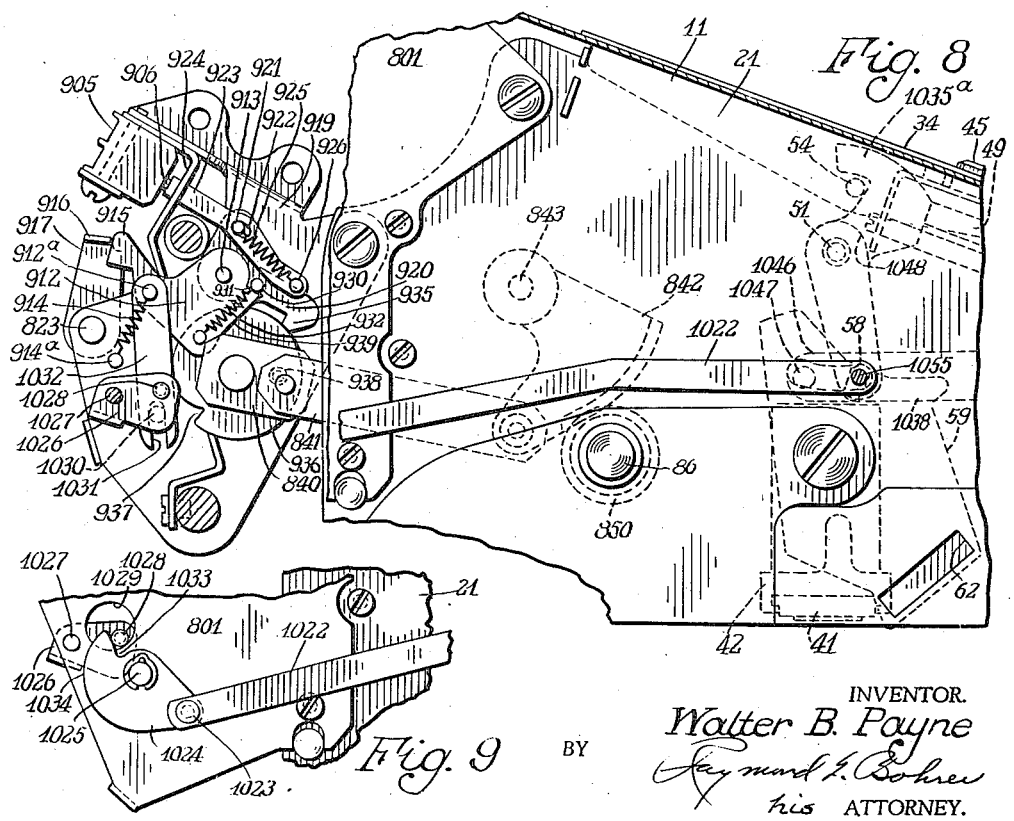

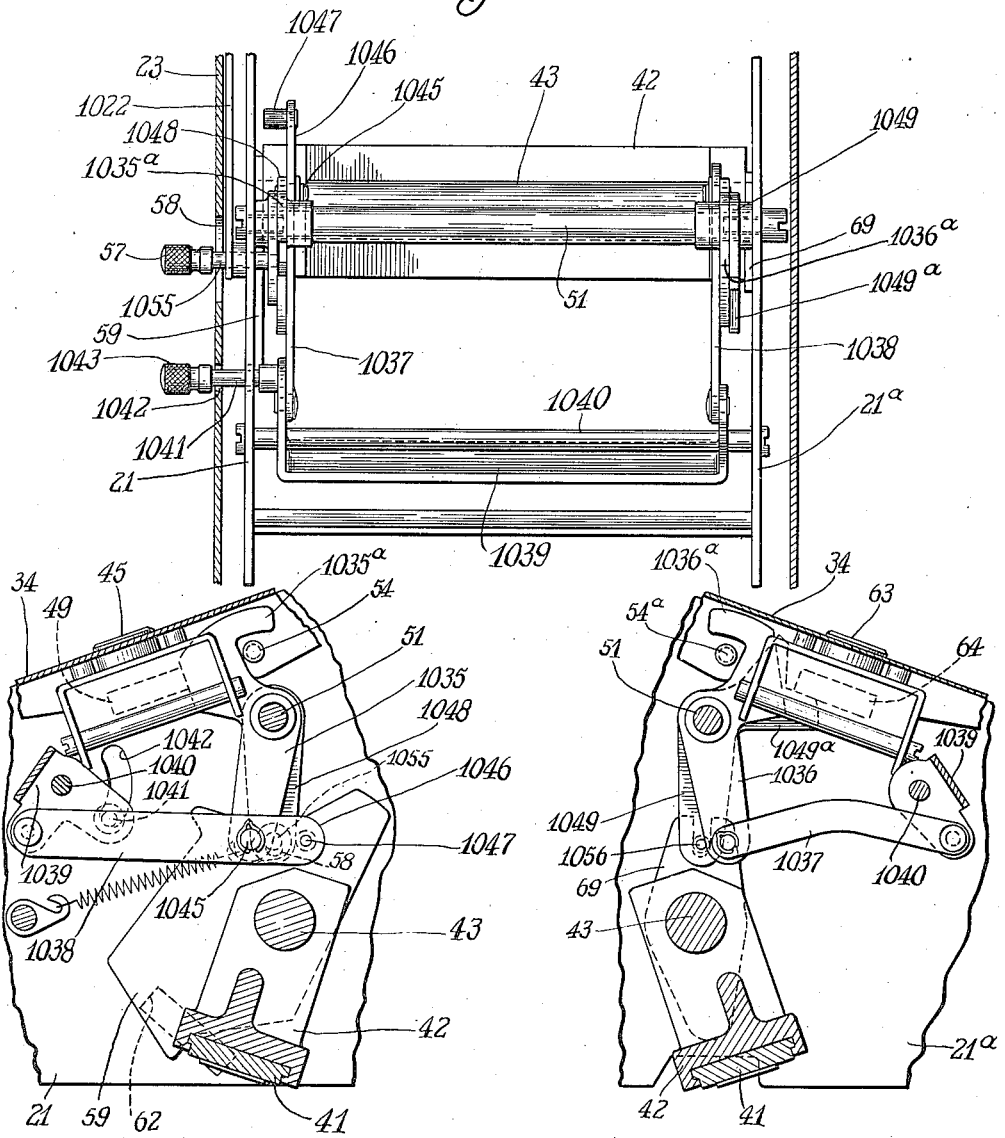

April 11, 1944. W. B. PAYNE 2,346,603
PRINTING APPARATUS
Filed Feb. 28, 1940 7 Sheets-Sheet 7

INVENTOR.
Walter B. Payne
BY Raymond L. Bohier
his ATTORNEY.

Patented Apr. 11, 1944

2,346,603

UNITED STATES PATENT OFFICE 2,346,603

PRINTING APPARATUS

Walter B. Payne, Rochester, N. Y., assignor to The Todd Company, Inc., Rochester, N. Y., a corporation of New York Application February 28, 1940, Serial No. 321,307

1 Claim. (Cl. 101—299)

This invention relates to improved mechanism for motor driven printing apparatus, such as signature imprinting machines or the like, adapted to print a facsimile signature or mark of the maker on a bank check or other instrument to validate or render it negotiable. An object of the invention is the provision of mechanism which prohibits unintentional operation or deliberate manipulation of such a machine, and which requires a predetermined setting before an imprint may be taken therefrom.

Another object of this invention relates to the provision of improved mechanism under the control of a selectively shiftable printing plate carrier which prohibits closing the motor circuit and tripping the clutch mechanism of the driving means when the plate carrier is at any predetermined position other than the "print" position of the machine.

An additional feature of the invention resides in the provision of a plurality of key operated locks to control the movement of a shiftable printing plate carrier to and from a plurality of predetermined positions, and devices to prevent setting the machine in operation when the plate carrier is at any predetermined position other than "print" position.

A further feature of the invention resides in the provision of improved mechanism which requires positively opening the motor circuit before a member of the printing couple can be displaced from the "print" position of the machine.

A still further feature of the invention resides in the provision of an improved common key operated locking mechanism for a cover latch means and a selectively shiftable type carrier means.

Still another feature of the invention is in the provision of lock controlled latch means and type shifting means controlled from movement to a certain predetermined position by the cover latching means.

A further feature of the invention resides in an improved key operated locking means for the cover latching means and a selectively shiftable type carrier, and which permits removal of the cover means and access to the internal operating mechanism even though the machine becomes jammed during the cycle of operation thereof.

To these and other ends the invention resides in certain improvements and combinations of parts, all as will be hereinafter more fully described, the novel features being pointed out in the claim at the end of the specification.

In the drawings:

Fig. 4 is a rear elevation of the machine with the casing broken away to show the parts of the operating mechanism.

Fig. 5 is a fragmentary vertical sectional view taken substantially in the plane of the line 5—5 of Fig. 4, showing the operator's lock unlocked and the shiftable printing plate holder moved to "print" position but the other operating mechanism of the machine in normal position.

Fig. 6 is a fragmentary vertical sectional view taken substantially on the line 6—6 of Fig. 4, showing the clutch mechanism of the driving means in ineffective normal position.

Fig. 7 is also a fragmentary vertical sectional view taken substantially on the line 7—7 of Fig. 4 showing the shiftable plate holder or carrier at "print" position but the switch control mechanism and other operating parts in normal position.

Fig. 8 is a view similar to Fig. 7, but showing the switch mechanism tripped to close the motor circuit and certain operating parts in the position assumed when the machine has been actuated through approximately half of the operating cycle.

Fig. 9 is a detail vertical sectional view showing the switch control yoke and control plate in the position assumed when the printing plate carrier is shifted to the "print" position.

Fig. 10 is a detail vertical sectional view taken substantially on the line 10—10 of Fig. 1, looking toward the right-hand side plate of the machine, and showing the operator's lock locked and effective to prevent shifting of the plate carrier from "non-print" position to "print" position.

Fig. 11 is a detail vertical sectional view taken substantially on the line 11—11, Fig. 1, looking toward the left-hand side plate of the machine, and showing the executive's lock locked and effective to prevent release of the cover latch means and the latch means prohibiting shifting of the printing plate carrier from "non-print" position to "load" position.

Fig. 14 is a detail plan view of the casing latch means and the printing plate carrier shifting means.

Fig. 15 is a fragmentary vertical sectional view similar to Fig. 9, showing a modification of the switch control means.

Fig. 16 is a view similar to Fig. 15, showing the switch control means effective to hold the switch open when the printing plate carrier is shifted to a position other than "print."

Figure 1:
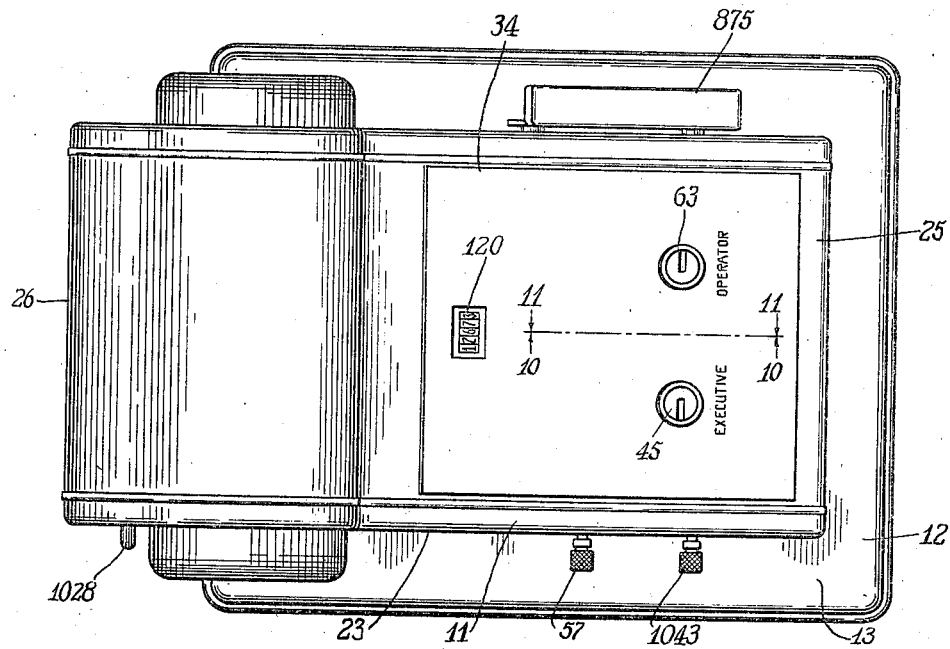
Fig. 1 is a plan view of a machine embodying the invention.

In the illustrated example of the invention disclosed in the drawings and described hereinafter, said invention is adapted to operate with the mechanism fully disclosed and described in my pending application filed April 15, 1938, serial No. 202,261, now issued as Patent No. 2,212,124, dated August 20, 1940, for improvement in Printing apparatus. Check signing devices of the character set forth in the foregoing application and generally shown and described herein are adapted for use in connection with disbursement procedures of business institutions. With the increasing use of bank checks, drafts, and other commercial instruments, it is a laborious and inconvenient task to inscribe a written signature on a large number of instruments. Therefore, it is now an accepted method to apply a facsimile signature or symbol of the maker with a signing machine. In business institutions such a machine is normally under the jurisdiction and control of an executive but the actual operation thereof is delegated to a subordinate, thereby relieving the executive so that he can devote his time to better advantage.

It is essential to provide check signing machines of the aforesaid character with locking devices to provide executive control over the apparatus and to permit the executive to delegate the actuation thereof to a subordinate. After the device is conditioned by the executive for operation by the operator, the actuation of the device is then normally under the control of an operator's lock, that is, the operator may unlock and adjust the device for printing and perform the task of imprinting facsimile signatures on checks or other instruments. A register is adapted to record each actuation of the imprinting mechanism, whereby the operator may be held accountable for every imprint shown recorded on such register during the time the device is under his control.

It has been found expedient to provide check signing machines of the character disclosed and described in my pending application, Serial No. 202,261, with a motor driving mechanism to relieve the operator of the manual operation and to increase the production in a normal day's work. An illustrative embodiment in a motor drive mechanism disclosed in the drawings and hereinafter generally described, is fully disclosed and described in my pending application filed June 27, 1938, Serial No. 215,964, now issued as Patent No. 2,229,339, dated January 21, 1941, for improvement in Motor Drive for Checkwriter and the Like. This is merely a convenient example of one kind of motor drive mechanism which may be employed with a check signing machine.

Heretofore, signing machines of the character described in my copending application Serial No. 202,261, were equipped with electric motors which oscillated the drive shaft in substantially the same manner as the hand lever. In this transition the motor drive mechanisms were added to the hand-operated machines without any attempt to modernize or improve the operating and actuating mechanism of the machine. However, in machines where an operator is held responsible for the actuation of the devices as accounted for by a register, it is important to provide means to eliminate unintentional or accidental manipulation thereof. As will be hereinafter pointed out, I have provided suitable mechanism to eliminate such manipulations and to assure positive control or operation of a check signing machine or the like.

Except for the changes hereinafter mentioned, the printing apparatus and motor drive mechanism hereinafter generally described as an example may be constructed substantially as the devices disclosed in my aforesaid copending applications, and the parts thereof are here given the same reference numerals applied to them in said applications. The reference numerals below "1000" in the present specification and drawings refer to parts generally disclosed herein and also disclosed in my prior applications. The reference numerals above "1000" are used for parts of the improved mechanism of the present invention and for such parts of the printing apparatus or motor drive mechanism as have been altered from the construction shown in my prior applications and generally described herein.

To more clearly located and define the operation of the device shown in the drawings, a short description of the normal operation of the printing apparatus and motor drive mechanism will be given. A check or other instrument to be signed is inserted in the throat of the apparatus provided between the upper case section 11 and the base section 12. The base 12 has a surface 13 upon which a sheet or check is adapted to be positioned in the machine with relation to the adjustable stops 14. The stops 14 are used to position the sheet with respect to the printing line of the machine designated by the word "Signature" provided on the side cover plate 23, Figs. 2 and 3.

Figure 3:
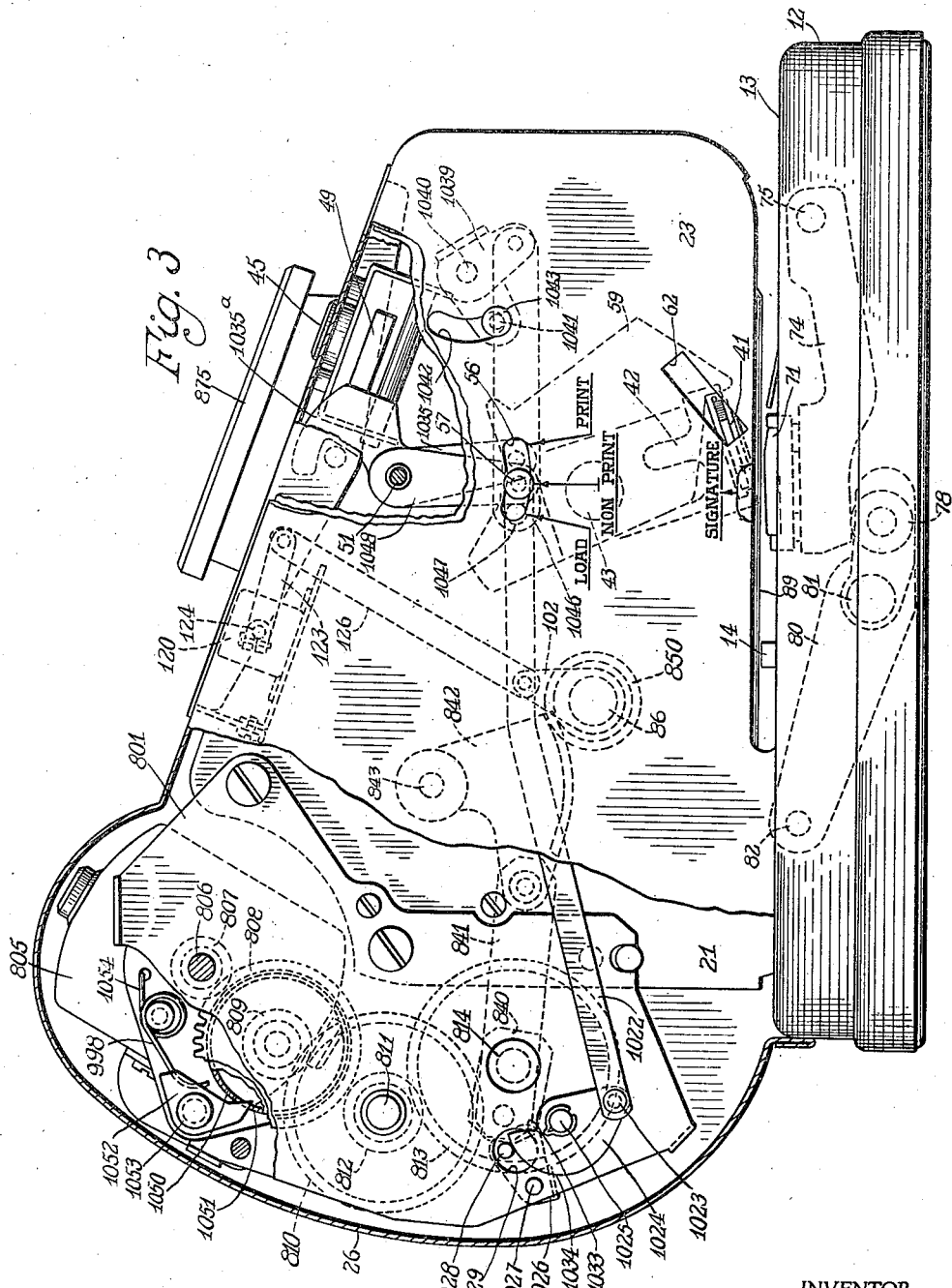
Fig. 3 is a side elevation of the machine, similar to Fig. 2, with the casing and frame partially broken away to show certain of the operating parts in a normal locked position or at "non-print" position.

A printing plate carrier 42 shown in dotted lines in Figs. 3 and 5 and in full lines in Figs. 10 and 11, is adapted to be selectively oscillated on the shaft 43, supported in the upper casing 11, to a plurality of predetermined positions under the control of a locking system. For the purpose of this disclosure the locking system includes an executive lock 45 and an operator's lock 63 carried by the removable top cover plate 34, Figs. 1, 3, 10, and 11. With this arrangement, when the machine is locked by both locks and at a "non-print" position as shown in Figs. 3, 10, and 11, the printing plate 41 removably supported by the carrier 42 is disposed away from the printing line or "print" position and the plate is not accessible for removal from the carrier. On the other hand, if the operator's lock 63 is unlocked the carrier and printing plate may be shifted from the "non-print" position to the "print" position (Fig. 5) to position the printing plate 41 at the printing line of the apparatus. In the event the executive lock is unlocked, while the operator's lock is locked, the carrier and printing plate 41 may be shifted from the "non-print" position to the "load" position, shown in Fig. 12, so that the printing plate 41 may be inserted into or withdrawn from the carrier 42 through an opening 62 provided in the side of the machine. The executive lock 45 also controls cover latch means to be hereinafter described so that when this lock is unlocked the latch mechanism may be independently actuated to permit removal of the cover plate 34 as well as removal of the front and rear plates 25 and 26 to allow access to the internal operating mechanism of the machine.

An executive, in preparing the machine for actuation by an individual delegated to perform the signing operation, hereinafter called the "operator," obtains the signature or printing plate from the safe or other place of safe keeping. In the preferred method of operation, both the executive and the operator's locks are locked at times when the machine is not in use, to retain the plate carrier in the "non-print" position. Therefore, the executive desiring to insert the printing plate into the machine, unlocks his lock and grasps the knob 57 (Figs. 2 and 3), and moves it rearward of the machine to the position marked "load" on the side cover of the machine. The plate carrier 42 is thereby oscillated about shaft 43 to the "load" position shown in Fig. 12. After inserting the printing plate 41 into the carrier, the knob 57 is again shifted to the "non-print" position, moving the carrier to a corresponding position as shown in Figs. 3 and 11. The executive relocks his lock 45 and after taking note of the number on the register 120, he may turn the device over to an operator for the purpose of signing checks or other instruments. The printing plate is locked into the machine and the register 120 will account for each subsequent actuation of the device for which the executive may normally hold the operator responsible.

After the device is conditioned by the executive, the operator, upon unlocking his lock 63, may shift the knob 57 to the "print" position and thereby position the carrier 42 and the printing plate 41 at the printing line of the machine. Upon inserting a check into the throat of the device and depressing the trip bar 875 a facsimile signature will be printed on the instrument in the manner to be presently described. Each actuation of the printing couple will be recorded on the register 120 to disclose the number of instruments signed. At the end of a day's work or upon completing a specific run of checks, the operator relocks the machine to prevent actuation thereof by an unauthorized person. The register provides for the executive comparing the number of checks actually signed with the register of the device as a check against fraudulent use of the machine.

At the end of a day or when desired, the executive upon unlocking his lock may shift the carrier 42 to "load" position and remove the plate 41. After removing the plate, the carrier is again shifted to the "non-print" position and locked in this location. The arrangement provides for the plate being removed from the machine for safekeeping and at the same time prohibits any attempt to use the device by inserting a substitute printing plate.

In Figs. 3 and 5 there is shown a platen member 71 adapted to be moved into cooperative engagement with the printing plate 41 when the operator's lock is unlocked and the carrier 42 is adjusted to the "print" position. The platen 71 is adjustably supported on the platen arm 74 pivotally mounted on a cross rod 75 having its end supported in the base section 12. The platen arm 74 is normally in cooperative engagement with a roller 78 carried by the rocker arm 80 pivotally supported on a cross shaft 81 also supported in the base section 12.

The machine is provided with a main operating shaft 86 journalled for rotation in the side frames 21 and 21a of case section 11. Substantially adjacent the inner side of the frame plates 21 and 21a, two crank arms 252 are pinned to the shaft 86. Each of the arms 252 has a link 84 pivoted thereto at 87, and the lower end of the link has an elongated slot 83 which embraces the end of a cross rod 82 carried by the rear ends of the rocker arm 80. When the main operating shaft 86 is rotated in a counterclockwise direction, Fig. 5, the links 84 are moved downwardly. Because of the slots 83 the rod 82 is not moved at first, but near the latter part of the downward movement of the links, the upper end of the slots 83 come in contact with the rod 82 and begin to force the rod downwardly, so that the parts act as a toggle to rock the rocker arm 80 and raise the platen lever 74 to effect cooperative engagement of the members of the printing couple, comprising the printing plate 41 and platen 71.

Within the upper casing section 11 there is suitably supported a pair of spools 90 and 91 which carry a transfer member 89, such as an ink ribbon, which is adapted to be disposed between the members of the printing couple. Suitable means may be operatively connected to the main shaft 86 to advance the ribbon between the members of the printing couple. The ribbon winding mechanism is not shown in the drawings as it forms no part of the present invention. One form of ribbon advancing means suitable for this machine is shown and described in my Patent No. 2,092,852, dated September 14, 1937, covering a checkwriting machine. Such an arrangement provides that each actuation of the machine winds a portion of the ribbon on the spool 91, unwinding it from the front supply spool 90 so as to bring a different portion of ribbon to the printing line of the machine. Obviously, any suitable form of rewinding mechanism may be embodied in the device.

In a machine of the character shown in the drawings, it is highly desirable to provide means whereby each printing operation therefor is recorded and accounted for. A register 120, Fig. 3, is suitably supported within the upper casing 11, and may be of any conventional type, but preferably of a non-resettable character so as to accurately account for each actuation of the machine and impression made therefrom. An arm 123 is held rigid to the actuating shaft 124 of the counter 120. A link 126 is connected at one end to the arm 123 and at the other end to a crank arm 102 having a hub fixed on the main operating shaft 86. Therefore, it will be seen that upon actuation of the main shaft 86, the crank arm 102 will actuate the link 126 to record each actuation of the machine.

The motor drive mechanism for the printing device shown in the drawings includes a gear segment 842 (Fig. 3) mounted to oscillate on a stub shaft 843 suitably supported within the upper casing 11. The gear segment 842 has teeth meshing with a pinion 850 pinned to the main shaft 86. A connecting rod 841 (Figs. 3 and 7), is pivoted at one end to the gear segment 842 and at the other end to a crank 840 secured to the clutch shaft 814. Therefore, a single revolution of the clutch shaft 814, caused by a single rotation of the clutch, to be hereinafter described, will cause one revolution of the crank 840, which will swing the gear segment 842 first forwardly to the position shown in Fig. 8, and then rearwardly, oscillating the main shaft 86 first in a clockwise direction and then in a counterclockwise direction, in the same manner as though it were oscillated by a hand crank attached to the shaft.

To the side frames 21 and 21a of the printing apparatus are secured rearwardly extending plates 801 and 802 (Figs. 3, 4, and 5) constituting the main side plates of the motor drive unit. Most of the motor drive mechanism is mounted between or supported by these side plates, such mechanism including an electric motor 805. On the armature shaft 806 is a pinion 807 (Figs. 3 and 4) driving a gear 808 rotatable on a stub shaft, which gear is secured to or integral with a pinion 809 driving another gear 810 fixed to the righthand end of the shaft 811, as best seen in Fig. 4. This shaft, near its left end, carries a pinion 812 meshing with a gear 813 (Figs. 3 and 4) rotatable on the clutch shaft 814. The gear 813 has a hub operatively connected to a hub of a clutch disc 815 having a toothed periphery (Figs. 4, 5, and 6). The gear 813 and the driving disc 815 are arranged to rotate on the shaft 814.

A second clutch disc 816 is pinned to the shaft 814, and on a lateral stud 817 carried by this disc 816 is a clutch dog 818 having an ear adapted to engage the teeth of the driving disc 815 when the dog is in one position. Another ear 818a of the dog engages a recess in an operating dog 819 pivoted on another lateral stud 820 on the disc 816. An ear 821 on the dog 819 lies in the plane of a release lever 822 pinned to a control shaft 823. When the parts are in the position shown in Fig. 6, the end of the release lever 822 is in contact with the ear 821 of the dog 819 and holds this dog in such position that the other dog 818 is out of contact with the tooth driving disc 815. If the release arm 822 is swung away from the rear 821 as by turning the shaft 823 in a clockwise direction to the dotted line position shown in Fig. 6, then a spring 825 will swing the dog 819 about its pivot 820, which will swing the other dog 818 in a counterclockwise direction about its pivot 817 and will move the ear of the dog 818 into contact with the periphery of the tooth driving disc 815 so that it will engage in the next available notch thereof, thus establishing a driving connection between the driving disc 815 and the clutch disc 816.

A backlash dog 827 pivoted at 826 to the disc 816 is provided for cooperation with the tooth disc 815 as the clutch completes a single revolution and comes around once more to its initial position. With this arrangement the tail 829 of the backlash dog comes in contact with the cross rod 830, which moves the dog 827 in a counterclockwise direction about its pivot 826 and releases the dog from the disc 815. At about this time the ear 821 on the dog 819 abuts against the release arm 822, which throws the dog 819 in a counterclockwise direction and thus releases the dog 818 from the tooth disc 815, interrupting the driving relation. Also, at about the same time, a notch 831 in the periphery of the disc 816 comes opposite a roller 832 on an arm 833 mounted for oscillation on the shaft 834, and attached to one end of a spring 835 (Figs. 4 and 6) which keeps the roller 832 pressed against the periphery of the disc 816 so that when the notch arrives, the roller drops into the notch and resiliently holds the disc 816 in this normal rest position. The other end of the spring is attached to the shaft 823 and tends to constantly turn this shaft in a counterclockwise direction when viewed as in Fig. 6.

When the clutch is engaged the notched driving disc 815 drives the clutch disc 816, which, being pinned to the shaft 814, drives the shaft in a clockwise direction as viewed in Fig. 6 and in a counterclockwise direction as viewed in Figs. 3, 7, and 8. Therefore, it will be seen that the rotation of the shaft 814 will rock the segment 842 to rotate the main drive shaft 86.

A flange disc 1050 (Figs. 3 and 4) is fixed on the gear 808 and adapted to rotate therewith. The flange of this disc is formed with a plurality of spaced openings 1051 around its periphery. A dog 1052 is pivoted at 1053 to an auxiliary supporting plate 999 and has the grasshopper spring 1054 resiliently holding the dog 1052 either in contact with the flange of the disc 1050 or in engagement with one of the notches 1051 formed therein. This arrangement eliminates the possibility of a backlash movement in the gear train when the motor circuit is opened. The dog 1052 also prohibits retrograde movement of the gear train at any time as the end of the dog will enter one of the notches of the flange disc 1050 to prohibit reverse movement of the gear train.

It is preferable to have the motor 805 run only during the cycle of operation of the printing machine. In the preferred form the motor 805 is supplied with current from any suitable source, such as a flexible electric cord having a female plug received in the socket 900, Fig. 4. A wire 903 leads from the plug 900 to the motor 805. Another wire 904 leads from the plug 900 to the switch indicated in general at 905. This switch 905 is conventionally of the plunger type, being controlled by a plunger 906, Figs. 7 and 8, which, when pressed in, closes the circuit and starts the motor, and when pressure is released an associated spring thrusts the plunger outward again to open the switch. A wire 907 leads from the other side of the switch 905 to one side of a centrifugal governor switch generally indicated at "A," Fig. 4, and not forming a part of the present invention. Another wire 908 leads from one side of this centrifugal governor switch to the motor 805. Another wire 909 leads from the wire 904 to that side of the governor switch to which the wire 908 is connected, a condenser 910 being interposed in this wire 909.

Suitable mechanism is provided for normally operating the switch 905. This mechanism includes a lever 912, (Figs. 4, 7, 8, and 12) mounted to turn on a stud 913 fixed on an auxiliary frame plate 919 of the machine. A coil spring 914, fixed at one end to a stud 914a on the frame plate 919 and at the other end to a stud 912a on the lever 912, tends to turn the lever in a counterclockwise direction when viewed as in Fig. 7. A nose 915 on the lever lies in the plane of an ear 916 on an arm 917 fixed to the control shaft 823. It will now be seen that the arms 917 and the clutch release lever 822 (Fig. 6) are both fixed to the control shaft 823 for simultaneous movement.

Pivoted on the same stud 913 is a two-arm lever 920, one arm of which carries a laterally projecting stud 921 extending through a slot 922 (Fig. 7) of a switch plunger operating piece 923, the end of which extends through and is guided in a fixed flange 924 of a supporting member. The rear end of the part 923 is in line with the switch operating plunger 906, so that when the part 923 moves rearwardly from the position shown in Fig. 7 to that shown in Fig. 8, it presses the plunger and closes the switch 905. A coil spring 925 is secured at one end to the stud 921 and at the other end to a stud 926 on the other end of the part 923, to tend to move the part 923 rearwardly as far as the length of the slot 922 will permit.

The two-arm lever 920 carries a stud 930 which overlies a shoulder on the lever 912. A spring 932 is connected at one end to this stud 930 and at the other end to a stud 933 on the lever 912 and tends to hold the stud 930 against the shoulder of the lever 912. The lever 920 also has a nose 935 lying in a plane of and adjacent the periphery of a disc 936 fixed to the shaft 814 to turn therewith. The disc 936 has a notch 937 in its periphery, and the disc also carries a laterally projecting stud 938 arranged to cooperate with the lower edge of the lever 912.

When the switch parts are in normal rest position they are arranged as indicated in Fig. 7, with the nose 915 of the lever 912 held by the lug 916, with the nose 935 of the two-arm lever 920 dropped in the notch 937 of the disc 936, with the member 923 withdrawn forwardly so that it does not press against the plunger 906, and the switch 905 is open.

The control shaft 823 may be operated in any suitable manner to cause the motor drive to operate through a cycle. For instance, the trip bar 875 (Fig. 5) may be mounted on the right side of the machine on a pair of bell cranks 876, only one of which is shown in the drawings. The pair of bell cranks are connected to each other by a link 877 so that the two bell cranks move in unison. A spring 878 tends constantly to elevate the trip bar 875 to its uppermost position. When the trip bar is depressed, this causes a counterclockwise rotation of the bell cranks 876 and a rearward movement of a link 880 (Figs. 4, 5, and 13) connected to one of the bell cranks. The rear end of this link 880 rests on a stud 890 carried by the plate 802. The flat end of the link 880a normally lies in line with a stud 881 projecting laterally through an opening in the plate 802 from an arm 882 fixed to the release shaft 823 so that a rearward thrust of the link 880 will contact the stud 881 and turn the shaft in a clockwise direction (Fig. 5) to move the clutch release lever 822 away from the lug 821 and normally engage the clutch for one revolution. The rocking movement of the shaft 823 will also move the arm 917 to normally trip the switch mechanism to allow the parts to move so that the part 923 engages the plunger 906 to close the switch 905.

When the control shaft 823 is turned (by depressing the trip bar 875) to start a cycle of operation, it swings the arm 917 and withdraws the lug 916 from beneath the nose 915 so that the spring 914 turns the lever 912 in a counterclockwise direction (Fig. 7) around its pivot 913. The shoulder 931 of the lever 912, pressing against the stud 930, forces the member 920 to turn correspondingly in a counterclockwise direction, which moves the stud 921 rearwardly and causes the member 923 to move rearwardly, pressing it against the switch plunger 906 and closing the switch (Fig. 8) so that the motor starts approximately simultaneously with the engagement of the clutch members 815 and 818.

Approximately half through the cycle of operation, the parts assume the position shown in Fig. 8 with the switch still closed. The notch 937 in the disc 936 has moved far enough away from the nose 935, and the nose rides on the concentric periphery of the disc, which thus maintains the switch closed until the notch 937 once more comes around in a counterclockwise direction (Figs. 7 and 8) to the nose 935, even though the lever 912 is meanwhile restored to initial position.

A little before completing the cycle of operation, the pin 938 (Figs. 7 and 8) on the disc 936 moves against the edge 939 of the lever 912 and cams this lever up to its initial elevated position with the nose 915 above the lug 916, and then when the pin 938 moves beyond lever 912, the nose 915 comes to rest on top of the lug 916. When the pin 938 raises the lever 912, the switch is not open because the nose 935 of the member 920 is still riding on the periphery of the disc 936 which prevents the lever 920 from moving back to the switch opening position. At just about the time the clutch parts 815 and 818 are opened by the contact of the lug 821 with the member 822 (Fig. 6), the notch 937 comes around to the nose 938 and the nose drops suddenly into the notch under the influence of the spring 932 (Fig. 7), withdrawing the plunger operating part 923 allowing the switch plunger 906 to move to its open position stopping the motor.

Figure 13:
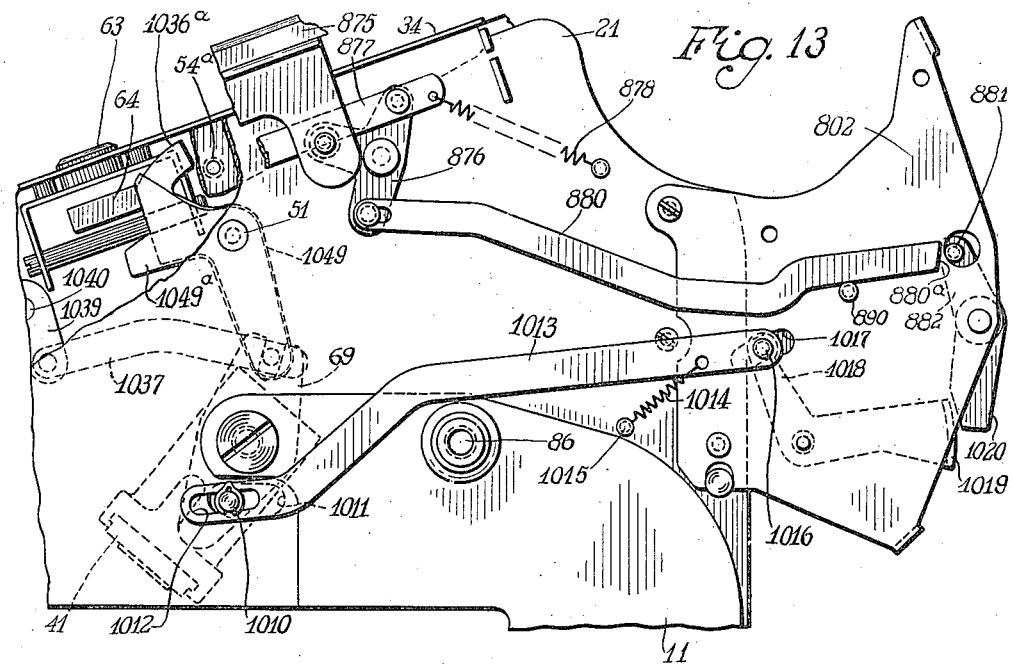
Fig. 13 is a fragmentary vertical sectional view similar to Fig. 5 showing the position assumed by the stop or blocking means when the plate carrier is in the "non-print" or "load" positions and effective to prohibit tripping the clutch means and the switch means of the operating mechanism.

In a machine of the type shown in the drawings, it is desirable to provide means which will prohibit actuation of the device unless the printing plate carrier is adjusted to the "print" position. My invention includes the provision of means to prohibit the tripping of the switch mechanism and clutch means unless the shiftable plate carrier is positioned at the printing line of the machine. In Figs. 4, 5, and 13, means is shown which prohibits actuation of the trip bar 875 unless the type carrier 42 is adjusted to the "print" position. In Fig. 5 the printing plate 41 is shown in the printing position with the carrier 42 adjusted to the "print" position. With the carrier 42 in "print" position, a stud 1010 which is arranged on one side of the carrier projects through an elongated opening 1011 of the side frame 21, contacts the one end of an elongated slot 1012 of a link 1013 so as to hold the link rearward against the tension of a spring 1014. This spring has one end attached to the link 1013 and the other end carried by a stud 1015 on the side frame 21. The other end of the link 1013 is pivoted to a stud 1016 projecting through an elongated slot 1017 of the auxiliary plate 802, and carried by a two-arm lever 1018. The two-arm lever 1018 is provided with a formed flange 1019 (Figs. 4 and 5) which is adapted to be moved to and from the path of a second arm 1020 of the member 882 on the control shaft 823.

When the printing plate carrier is adjusted to the "print" position, best shown in Fig. 5, the stud 1010 supported by the carrier holds the link 1013 rearward against the tension of the spring 1014 and the flange 1019 of the arm 1018 is out of the path of the portion 1020 of the arm 822. Therefore, it will be seen that with the printing plate carrier adjusted to "print" position the trip bar 875 may be depressed to rock the arm 882 and the shaft 823. With the flange 1019 held out of the path of the portion 1020, the arm 822 may be rocked in a clockwise direction so that the portion 1020 is moved to the dotted line position shown in Fig. 5. It will be clear from the foregoing general outline of the normal operation of the machine that when the printing plate carrier is adjusted to the "print" position the trip bar 875 may be depressed to rock the control shaft 823 so as to close the switch 905 and trip the clutch release lever 822, allowing a cycle of operation of the machine.

In the event the printing plate carrier 42 is adjusted to the "non-print" or "load" position (the latter which is shown in Fig. 13), the stud 1010 moves away from the end of the slot 1012 of the link 1013 thereby permitting the spring 1014 to move the link forward to the position shown in Fig. 13. In adjusting the printing plate carrier to either of these positions, the movement of the link from the position shown in Fig. 5 to that shown in Fig. 13, under the tension of the spring 1014, causes the two-arm lever 1018 to rock about its pivot so as to position the flange portion 1019 thereof in the path of the portion 1020 of the arm 882. Therefore, when the printing plate carrier 42 is adjusted to the "non-print" or "load" position the portion 1020 of the arm 822 is blocked from movement in a clockwise direction by the flange 1019 (Fig. 13) of the lever 1018, so that the control shaft 823 cannot be rocked. It will therefore be seen that the trip bar 875 cannot be depressed to affect a cycle of operation of the machine when the printing plate carrier is adjusted to any of the predetermined positions other than the "print" position.

A portable electric check signing machine of the character described herein is adapted to be moved from one department of a business institution to another. For example, it may be used once a week by the payroll department to sign pay checks, and the balance of the time in the general disbursement departments. Naturally, in moving the device from one department to another it will be necessary to detach the electrical cord. Numerous other occasions are likely to develop which may necessitate detaching the electric cord from the device.

An operator may unwittingly thereafter set the printing plate carrier 42 to "print" position and depress the trip bar 875 without realizing that the electrical cord has been detached from the plug 900 or the electrical outlet. Obviously, upon depressing the trip bar with the cord disconnected the machine will not function. However, the control shaft 823 will be rocked to trip the clutch lever 822 and the switch arm 917. Under such circumstances, it is preferable for the operator to reset the carrier to "non-print" position before replacing the cord. Otherwise, upon inserting the cord an electrical fuse may be blown in the line or the machine will be energized to move through a cycle of operation (having been previously tripped) without a check in the machine at all, or not properly positioned therein, and registering the actuation upon the register.

Because of the foregoing reasons, as well as other unintentional or accidental manipulations to which such a machine may be subjected, it has been found expedient to provide the device with switch control mechanism which necessitates positively opening the motor switch before the printing plate carrier may be moved away from "print" position, and to positively hold the switch open when the carrier is in any position other than the "print" position.

Referring to Figs. 3, 4, and 7 of the drawings, there is shown the means for positively controlling the switch 905 dependent upon the position of the type carrier 42. A stud 1055 which carries the manual selective knob 57 is operatively connected to the printing plate carrier 42 and operates through the opening 56 (Fig. 3) of the casing 23 and side frame 21. A link 1022 arranged between the side plate 23 and frame 21 has one end carried by the stud 1055. The other end of this link is pivoted at 1023 to a control plate 1024 carried by the stud 1025 on the auxiliary frame plate 801. Therefore, it will be seen that as the knob 57 is moved to shift the carrier 42 to its various positions the control plate 1024 will be rocked correspondingly about its pivot 1025.

A yoke member 1026 is supported between the supporting plate 919 and the frame 801 by the cross rod 1027. An upwardly formed end of the yoke arranged adjacent the frame 801 carries a stud 1028 (Figs. 3, 4, and 8) which projects through the opening 1029 of the frame and into the path of the control plate 1024. The opposite end of the yoke 1026 carries a stud 1030 (Fig. 7) operative in the slotted end 1031 of a link 1032. The link 1032 has its other end pivoted to the stud 912a carried by the arm 912 of the switch mechanism previously described.

When the machine is selectively positioned at the "print" position the control plate 1024 and the yoke 1026 are in the positions best shown in Figs. 7 and 9. It will be noted from Fig. 9 that the link 1022 has been moved forwardly sufficiently to permit the stud 1028 on the yoke to drop behind the recess portion 1033 of the control plate 1024. When the yoke is permitted to assume the position shown in Fig. 9 (because of the stud 1028 entering the recess 1033), the stud 1030 on the other side of the yoke rests in the position shown in Fig. 7, that is, near the open end of the slot 1031 of the link 1032. The slot 1031 permits the link to move downwardly to the positions shown in Fig. 8 when the switch lever is released and the machine is set at "print" position.

After an operator has signed a run of checks and desires to relock the machine, it is necessary to reset the machine to "non-print" position. With my improved switch control mechanism it is impossible to shift the carrier 42 to the latter position until switch lever 912 is positively raised to open the switch 905 or the lever is positively held against movement to open the switch. The stud 1028 resting in the path of the plate 1024 (Fig. 9) prohibits clockwise rotations of the plate about its pivot 1025. Therefore, the knob 57 connected to the plate 1024 (through the link 1022) and to the carrier 42 cannot be shifted to move the printing plate from "print" position until the stud 1028 is displaced from the path of the control plate 1024.

In desiring to shaft the carrier from "print" position, the operator must grasp the stud 1028, which projects to the exterior of the machine (Fig. 2) and raise it out of the recess 1033 of the control plate 1024. As soon as the carrier 42 is shifted from "print" position, by the knob 57, the concentric portion 1034 of the control plate engages the stud 1028 and holds it in raised position. The stud is held in the latter position by the portion 1034 of the control plate when the carrier is shifted to any of the predetermined positions other than the "print" position.

Figure 12:
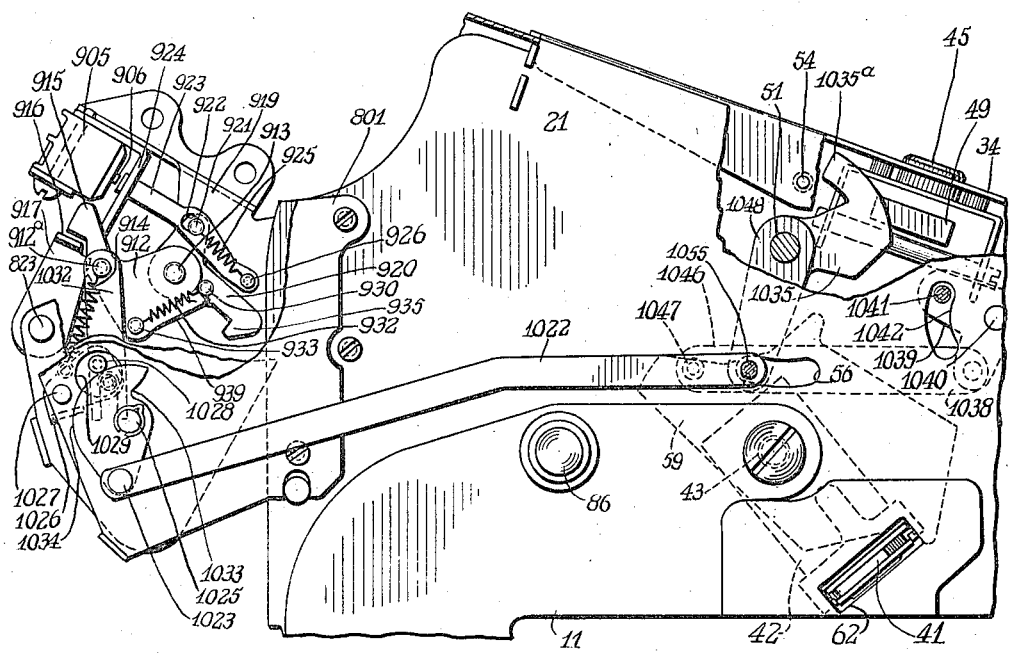
Fig. 12 is a fragmentary vertical sectional view similar to Fig. 7, but showing the executive lock bolt withdrawn and the printing plate carrier shifted to "load" position, and the switch control member effective to prevent closing the motor circuit.

In raising the stud 1028, the yoke 1026 is rocked on the rod 1027 so that the stud 1030 engages the bottom of the slot 1031 of the link 1032. Upon reaching the end of the slot, the continued movement of the pin 1030 will move the link 1032 upwardly against the tension of the spring 914 and rock the switch lever 912 about its pivot 913. The arrangement provides that when the stud 1028 rests on the portion 1034 of the control plate 1024, the yoke 1026, through the pin 1031 and link 1032, holds the switch lever 912 from closing the switch 905. As best seen in Fig. 12, the switch lever 912 is positively held against movement to close the switch 905 when the carrier 42 is in any other than the "print" position.

This switch control means prohibits the machine from operating when the printing plate carrier is in an abnormal position, that is, in any position other than "print." This means eliminates the possibility of the machine becoming jammed or damaged under various circumstances, for example, an occasion on which the operator depresses the trip bar when the cord is detached, as previously described. Without this control means, the operator would reset the carrier to "non-print" position and then upon connecting the electrical cord, the machine would immediately start to move through a cycle of operation. With the carrier and other parts in an abnormal position, the operating mechanism would become jammed and possibly damage the actuating parts of the device. On the other hand, if the operator is required to reset the switch mechanism before being able to shift the carrier from "print" position to "non-print" position, the machine would not start to function when the cord is attached to the device. Therefore, with my improved switch control mechanism, the operator is required to reset the switch mechanism before shifting the carrier from "print" position, and cannot unknowingly or accidentally cause the machine to function so as to damage the operating mechanism or record an imprint on the register 120 which cannot be properly accounted for by the operator.

As previously mentioned the entire machine is under the control of a key operated locking system, which includes the executive lock 45 and an operator's lock 63. The lock of each party normally controls certain functions of the check signing machine as previously stated.

Figure 2:
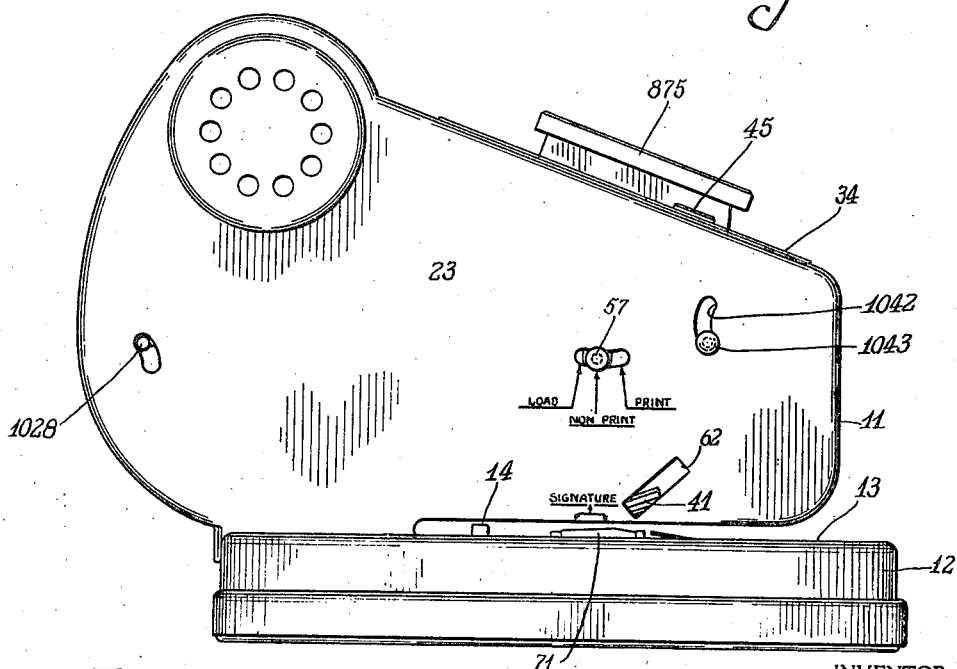
Fig. 2 is a side elevation of the same.

The executive's lock 45 is suitably supported on the cover plate 34 and the bolt 49 thereof is adapted to be moved to and from the path of movement of the cover latch arm 1035. When the lock 45 is locked the bolt 49 thereof prohibits the movement of the latch member 1035 in a clockwise direction from the latch position shown in Fig. 3 to the unlatch position seen in Fig. 12. The latch member 1035 has a portion 1035a which is adapted to extend over the top of a stud 54 rigid with the side flange of the cover 34. The latch arm 1035 is positioned adjacent the left hand side of the machine and supported on a cross shaft 51. A similar latch arm 1036 is arranged along the right hand side of the machine adjacent the side frame 21a, Fig. 10. The latch arm 1036 has a portion 1036a adapted to be moved over the top of another stud 54a arranged on the opposite side of the cover 34. The latch arms 1035 and 1036 are connected (Figs. 10 and 11) for simultaneous operation through the links 1037 and 1038 connected with the yoke member 1039. This yoke is supported on the cross rod 1040 having its ends journalled in the side frames 21 and 21a. As best shown in Figs. 2, 3, and 11, a stud 1041 carried by the yoke projects through a slot 1042 of the machine and is provided with an operating knob 1043 for manual shifting of the yoke 1039.

When the executive's lock is unlocked the bolt 49 is withdrawn from the path of the latch lever 1035. Therefore, in the event the executive upon unlocking the machine desires to remove the cover 34, he grasps the knob 1043 and rocks the yoke 1039 in a clockwise direction (Fig. 3) so as to move the latch portions 1035a and 1036a from the path of the studs 54 and 54a. The cover 34 may then be raised to permit access to the internal mechanism of the machine. The cover carries studs 33 which suitably hold the front and rear cover sections 25 and 26 in place, and upon removing the cover 34 these sections may then be also displaced.

When the executive desires to shift the carrier 42 to the "load" position to remove (or insert) the printing plate 41 therefrom, it is also necessary for him to unlock his lock and withdraw the bolt 49 (Fig. 3) from the path of the latch lever 1035a. The link 1038 (Fig. 11) pivoted at 1045 to the latch lever 1035 has an extending portion 1046 which carries a stud 1047. This stud projects in the path of movement of a lever 1048 supported on the rod 51. When the bolt 49 prohibits movement of the latch lever 1035a in a counterclockwise direction (Fig. 11), the stud 1047 blocks any counterclockwise movement of the arm 1048 about its pivot 51. Therefore, unless the latch dog is permitted to be moved by the withdrawal of the bolt 49, the arm 1048 may not be rocked in a counterclockwise direction to position the carrier 42 at "load" position.

The pivoted lever 1048 carries the stud 1055 engaging in a slot 58 of a plate 59 rigid with the carrier 42. The stud 1055 is that which passes through the casing and carries the selector knob 57. Therefore, when the lock bolt 49 is withdrawn by the executive's key, the latch arm 1035 and the lever 1048 are free to move in a counterclockwise direction about the pivot 51. Therefore, the knob 57 carried by link 1048 and operatively connected to the carrier 42, may be shifted to move the carrier to "load" position. However, with the bolt 49 holding the latch 1035, the stud 1047 prohibits the movement of the link 1048 to shift the carrier to "load" position. It will now be seen that the executive lock bolt not only controls the shifting of the carrier to "load" position but also governs the independent latch means for the casing.

While the cover latch means carries the stud 1047 in operative connection with the carrier shifting arm 1048, it is capable of independent action when the executive's lock is unlocked. Therefore, the executive may gain access to the internal operating mechanism of the machine at any time. This feature is especially advantageous in the event the device becomes jammed for any reason.

The operator's lock 63 normally controls shifting of the carrier 42 from the "non-print" position to the "print" position. The bolt 64 of the operator's lock 63 is adapted to be moved in the path of the ear 1049a of the arm 1049, to prohibit a counterclockwise movement (Fig. 10) of the arm. This arm carries a pin 1056 projecting in a slot of the plate 69 rigid with the carrier 42 on the opposite side of the plate 59. Therefore, when the arm 1049 is held from movement in a counterclockwise direction, the carrier 42 is held from movement from the "non-print" position shown in Fig. 10 to the "print" position, Fig. 5.

When the operator's lock is unlocked, the bolt 64 is withdrawn and the arm 1049 is permitted to be shifted to the position shown in Fig. 5. Upon unlocking the operator's lock, the knob 57 is shifted to move the plate carrier to the "print" position. The stud 1046, Fig. 11, under the control of the executive lock does not prohibit a counterclockwise movement (Fig. 10) of the carrier 42 to "print" position.

As suggested by Figs. 15 and 16, the switch control mechanism may be modified slightly by providing a different arrangement for the manually operated stop pin 1028. In these views the corresponding parts are designated by the same reference numerals as before with the addition of the index b. A grasshopper spring 1060 is supported on the end of the cross rod 1027b projecting beyond the surface of the side plate 801b. This spring serves to normally hold the stud 1028b of the yoke 1026b up (Fig. 15) out of the path of the control plate 1024b. However, in the event the switch arm 917b is tripped to release the switch lever 912b the spring 914b tends to overcome the spring 1060 so as to exert tension on the parts to close the switch 905b.

In the event the machine is adjusted to "print" position, the stud 1028b will be permitted to move down in the path of the control plate 1024b in a manner previously explained. However, in the event the device is resting at any position other than "print," as shown in Fig. 16, and the arm 917b is tripped, the stud 1028b will only move downward slightly and engage the control plate 1024b. As seen in Fig. 16, when the parts are in the latter position, the switch lever 912b is not rocked about its pivot 913b sufficiently to close the switch 905b.

From the foregoing, it will be clear that the spring 1060 normally holds the pin 1028b out of the path of the plate 1024b. Therefore, unless the switch has been tripped and the machine is at "print" position, the operator will not have to manually open the switch mechanism before shifting the printing plate carrier from "print" position to any one of the predetermined positions thereof.

While one embodiment of the invention has been disclosed, it is to be understood that the inventive idea may be carried out in a number of ways. This application is, therefore, not to be limited to the precise details described, but is intended to cover all variations and modifications thereof, falling within the spirit of the invention or the scope of the appended claim.

Having thus fully described my invention, what I claim as new and desire to secure by Letters Patent is:

In a printing machine of the class described, the combination of a printing couple including type and platen members, selective means for shifting one member of the printing couple to and from "print" position, motor driven mechanism for moving the members of the printing couple into cooperative printing engagement, switch mechanism for controlling the circuit to the motor including a normally opened switch, spring means tending to close said switch, and releasable means cooperating with said spring means to normally restrain the spring means from closing the switch, a control part associated with said switch spring means and being adapted to be moved from a non-effective position to an effective position when the switch is closed, and a control member operatively connected to said shiftable member of the printing couple and movable therewith, said control member having a formed portion being adapted to be aligned with the path movement of said control part when said shiftable member of the printing couple is moved to "print" position, said control part being adapted when moved to said effective position to cooperate with said formed portion and thereby serve to prevent movement of said control member and said shiftable member of the printing couple when the switch is closed.

WALTER B. PAYNE.